United States Patent Office 3,700,575
Patented Oct. 24, 1972

3,700,575
METHOD OF FORMING TRANSPARENT FILMS OF ZnO
Thomas O. Paine, Administrator of the National Aeronautics and Space Administration, with respect to an invention of Paul H. Egli, 73 Maple Ave., Collingwood, N.J. 08108
No Drawing. Filed Nov. 26, 1969, Ser. No. 880,398
Int. Cl. C23c 15/00
U.S. Cl. 204—192                                8 Claims

ABSTRACT OF THE DISCLOSURE

A method of forming thin transparent film of zinc oxide on a transparent refractory substrate, which comprises sputtering pure zinc metal to form a thin metallic film on the substrate and then reacting the zinc film with oxygen from air to form a luminescent and transparent ZnO coating.

ORIGIN OF THE INVENTION

The invention described herein was made in the performance of work under a NASA contract and is subject to the provisions of Section 305 of the National Aeronautics and Space Act of 1958, Public Law 83–568 (72 Stat. 435; 42 USC 2457).

BACKGROUND OF THE INVENTION

(1) Field of the invention

This invention is in the field of forming luminescent screens. More particularly, the invention relates to a method of forming a zinc oxide coating on a glass substrate.

(2) Description of the prior art

It is well known that it is advantageous to produce a transparent film of phosphors for cathode ray tube screens. Thus, transparent films of a number of phosphors including silicates, tungstates and fluorides have been made by evaporating the compounds in a high vacuum. The resulting film deposits are then baked to reconstitute the phosphor compounds which decompose during evaporation.

It was previously realized that various parts of evaporated phosphor compounds do not evaporate at the same rate. Thus, the resulting film before it is baked comprises layers of different composition which separately are not the desired luminescent compound. The baking step on the refractory glass causes the film layers to react and to reform the original compound. Often, fluorides are substituted for oxides since zinc fluoride and manganese fluoride are easier to evaporate than the respective oxides. Additionally, these compounds are decomposed to form the oxides in the presenec of an excess of oxygen supplied by a thick silica oxide film and by this means again obtain the desired phosphor composition. Often part of the silicate required for a phosphor can be obtained by reaction of the metal salts with a silica glass substrate. Sulphide phosphors, for example, are made from evaporated films of sulphide compounds by baking in an atmosphere containing sulphur, while silicate phosphors are best baked in an oxygen rich atmosphere.

Thus it can be appreciated that in the prior art, transparent films formed on glass substrates, are often formed in oxygen or other atmospheres in an attempt to reconstitute or form the desired coating from a salt which had been initially vaporized and deposited. To date, attempts to produce the transparent films of luminescent ZnO by evaporating ZnO or other salts of Zn such as $ZnF_2$ and subsequently baking in an oxygen rich atmosphere have not produced high quality, efficient films.

OBJECTS AND SUMMARY OF THE INVENTION

Thus, an object of this invention is to provide a method for depositing a transparent, luminescent film of zinc oxide upon a transparent refractory substrate.

Another object of this invention is to provide a transparent refractory substrate having a transparent luminescent film of zinc oxide adhered thereto.

The above and other objects of this invention are accomplished by the herein method which comprises diode sputtering of pure zinc metal to form a thin film of essentially metallic zinc upon a transparent refractory substrate. The thin film is then baked in air to react with oxygen and form luminescent and transparent ZnO. The emission characteristic of the formed film can be controlled by the length of the baking cycle.

DESCRIPTION OF THE PREFERRED EMBODIMENT

Zinc oxide is a valuable phosphor for application in flying spot scanners because of its rapid decay. ZnO is commercially available in powder form as two standard phosphors which differ chemically by the oxygen concentration. The first of these phosphors, known as P–15, is the unsaturated form and has an emission in the ultraviolet and a second emission band in the green spectrum. The second form is known as P–24 and has a greater oxygen saturation. This second form has no ultraviolet emission but has a broader spectral emission centered in the yellow green.

In an attempt to produce transparent luminescent zinc oxide films, initial effort was directed to the previously described approaches utilized for other phosphor materials. This involved evaporating the powdered phosphor in a high vacuum to produce a thin film on a refractory glass substrate. The film was then subsequently baked in air at a high temperature to readjust any change in oxygen concentration which occurred during evaporation. Various baking cycles and atmospheres were tried, including hydrogen to reduce the oxygen concentration, oxygen to increase its concentration, air, and argon. No satisfactory luminescent films were obtained. It was presumed that the zinc oxide compound changed crystalline structure during evaporation and thus could not be successfully reconstituted utilizing these prior art approaches.

Another method which was attempted ot produce zinc oxide films involved triode sputtering which is an established technique for producing thin films of dielectric material. This approach utilizes an electric field which induces whole ions or molecules to transfer from a powder compact to a film substrate without change of character. Even though there are problems in producing large areas of uniform thickness utilizing the sputtering technique, it was hoped that small areas of film of a luminescent material could be formed. However, once again utilizing several baking procedures no luminescent zinc oxide was obtained.

The herein approach differs from the prior art techniques mentioned and involves simple diode sputtering of pure zinc metal to form a thin film of metallic zinc. This zinc film is then baked in air to react with oxygen from the air to form luminescent ZnO. Though it was believed that change in lattice size converting from a metal ion to the zinc oxide compound would initiate nucleation ana result in blotchy films of many grains, it was unexpectedly found that the films provided were exceptionally transparent and grainless. Further, though as indicated the starting material was pure zinc, the emission characteristics of the resulting transparent film could be selectively either the P–15 type or P–24 through control of the baking cycle. Thus, the longer the baking cycle, the more oxygen in the zinc oxide film and thus the tendency of the film to emit toward the P-24 region rather than the P-15 one.

To accomplish the method of the invention, the transparent refractory substrate to be coated is mounted in a steel ring about, for example, six inches from the source of the zinc material. The zinc is very pure and preferably in the form of a bar. A potential gradient of between 1200 to 1500 kv. is then maintained between the zinc and the metal substrate holder. It should be pointed out that the distance will affect the amount of voltage required. The aforegoing range is for a distance of six inches. At increased distance, the potential gradient is increased. Practically, it is not desirable to place the source of zinc much closer to the substrate than six inches. At, for example, four inches an uneven deposit with pinholes and thick specks will occur.

Upon application of the potential gradient, the zinc will then sputter onto the glass substrate. This operation is conducted in an atmosphere of 1 to 2 microns of argon in a vacuum chamber to minimize any reaction with oxygen. However, inert gases such as dry helium can be utilized.

It is pointed out that the aforegoing conditions provide a relatively poor vacuum. Such is desirable in that it produces a zinc metal film which contains a very small but finite concentration of oxygen. This is desirable in order for the zinc to properly adhere to the substrate, and further in order for the subsequent oxidizing procedure to proceed smoothly. It is more difficult for oxygen to react with a shiny, completely oxygen free film of pure zinc. The reaction is likely to start at random, isolated spots and proceed unevenly. If, however, the zinc film contains a few oxygen atoms uniformly dispersed, subsequent oxidation is initiated uniformly at these existing oxygen sites which were created by sputtering in a poor vacuum.

The resulting zinc film has a gray lustrous semi-metallic appearance which becomes more nearly white as thickness is increased. This film is opaque, non-luminescent, and easily rubbed off the glass substrate. The gradual shift in appearance with thickness provides an easy method to control the thickness of the subsequent luminescent film. Typically the sputtering is stopped as the film just approaches a whitish color. At this point the oxidized luminescent film will be a few thousand angstroms thick and will absorb an electron beam of up to 20 kv. Films thicker than this are likely to crack, and thinner films would have to be operated at lower voltages and therefore produce less brightness. Thus, the film might typically range from a few hundred to a few thousand angstroms.

After the zinc film has been deposited, the electric current is stopped, and the substrate removed to a furnace open to the air. Baking of the film in the furnace converts the zinc coating to a zinc oxide transparent and luminescent film.

The maximum temperature for baking is just below softening point of the glass substrate. For example, for Vycor glass the maximum temperature is 1100° C. Above which the glass begins to soften and sag. In order to minimize the length of baking, it is often desirable to bake near this upper limit. However, it should be understood that the conversion to the oxide is both time and temperature dependent. Thus, at lower temperatures, to obtain the same degree of oxidization, a longer heating time would be required. It is a simple trial and error method to determine the length of time at a given temperature at which one obtains a desired end product. For example, baking for 30 minutes at 900° C. will provide a film having a luminescent emission comparable to a P-15 powder. Alternatively, baking for the same period of time at 1100° C. will provide a P-24 powder. Additionally, the temperature of baking could range as low as 750° C. However, the length of time might be undesirably increased at such a temperature level. It is seen that, however, 30 minutes provides a relatively short period of time, yet is not so short that one might bake past the desired emission level. Longer baking at high temperatures can produce reaction with the glass substrate and result in the slower decay rate of resulting silicate phosphors. It is believed the invention can be further understood from the following detailed example:

EXAMPLE I

A Vycor plate having a dimension of 1 x 3 inches and of 1/16 inch thickness was mounted on a steel ring which surrounded the periphery of the plate. The ring and plate were supported by a metal post insulated from the base plate of the vacuum system by porcelain standoffs. The metal ring was located six inches above a bar of pure zinc. The zinc bar had a dimension of ½ inch diameter by 2 inches long, and was supported by an aluminum clamp insulated from the base plate by a 4 inch long porcelain standoff. The bar and steel ring were connected to a D.C. power supply which could produce up to 500 ma. up to 5 kv. The zinc bar and the Vycor plate together with the support apparatus was disposed in a vacuum apparatus with a 12" bell jar with a high vacuum mechanical forepump and a small two inch oil diffusion pump. The system was outgassed with the diffusion pump and subsequently operated only with the mechanical pump. The system was flushed with argon and subsequently maintained at a pressure of 0.2 micron of argon atmosphere so that the oxygen content of the atmosphere was very small. A mica shield was disposed between the zinc bar and the glass substrate. The voltage potential between the zinc bar and the metal ring supporting the glass substrate was slowly increased to 1250 volts. A bright purple glow discharge halo filled the bell jar, concentrated between the zinc bar and the metal ring indicating that charged particles were being emitted from the zinc bar. When voltage was first applied the halo visibly flickered and contained bright specks indicating an uneven discharge from the zinc. After about two minutes the glow became uniform and the mica shield was turned aside so that the zinc could deposit on the glass substrate. The amount of current drawn from the power supply served as a sensitive indicator. With this particular geometry and vacuum pressure the current was about 200 ma. Any change in current indicated either a change in vacuum pressure or the formation of a short circuit because of deposit of the zinc film on the ceramic insulators that separate the zinc bar or the steel ring from the metal base plate. After the glow discharge became steady and the mica shield was removed from the path, sputtering was continued for ten minutes at which point the deposited film was changing from lustrous gray toward white. At this point the electricity was discontinued and the plate removed from the holder and placed in an electric kiln open to the air. The plate was baked for 30 minutes at 950° C. The resulting film was transparent and had a luminescent emission equivalent to P-15 powder.

When the same procedure was repeated and a film was baked for 30 minutes at 1100° C., it had an emission equivalent to a P-24 powder.

What is claimed:

1. A method of forming a transparent film of luminescent ZnO on a transparent refractory substrate comprising:
    diode sputtering zinc metal at a voltage gradient between 1200 and 1500 kv. to form a thin film of zinc on said substrate, said zinc metal being at least about six inches from said substrate during said sputtering, and heating said substrate in air for a sufficient length of time to convert said zinc coating to transparent and grainless luminescent ZnO of either a P-15 or P-24 type.

2. The method of claim 1 comprising:
    conducting said diode sputtering in a weak vacuum sufficient to produce a slightly oxidized coating of zinc on said substrate.

3. The method of claim 2 comprising:
  conducting said sputtering in an atmosphere of 1 to 2 microns of argon.
4. The method of claim 1 comprising:
  heating said coated substrate in air to a temperature just below the softening point of the substrate.
5. A method of forming a transparent and grainless film of luminescent ZnO on a transparent refractory substrate comprising:
  surrounding said substrate with a conductive metal holder,
  disposing a source zinc metal at least about six inches from said substrate,
  maintaining a voltage gradient of between 1200 and 1500 kv. between zinc and said substrate sufficient to sputter a coating of zinc on said substrate,
  and heating said coated substrate in air to convert said zinc coating to transparent and grainless luminescent ZnO of either a P-15 or P-24 type.
6. The method of claim 5 comprising:
  maintaining a distance of about six inches between said substrate and said zinc source.
7. The method of claim 5 comprising:
  conducting said sputtering in a vacuum condition sufficient to deposit a slightly oxidized zinc coating on said substrate.
8. The method of claim 7 comprising:
  maintaining an atmosphere of 1 to 2 microns of argon during said sputtering.

References Cited

UNITED STATES PATENTS

| | | | |
|---|---|---|---|
| 2,917,442 | 12/1959 | Hanlet | 204—192 |
| 3,160,576 | 12/1964 | Eckert | 204—192 |
| 3,294,660 | 12/1966 | Kingery et al. | 204—192 |
| 3,420,763 | 1/1969 | Polito et al. | 204—192 |
| 2,996,403 | 8/1961 | Feldman | 117—33.5 |
| 2,996,404 | 8/1961 | Feidman | 117—33.5 |
| 3,314,871 | 4/1967 | Heck | 204—181 |

JOHN H. MACK, Primary Examiner

S. S. KANTER, Assistant Examiner

U.S. Cl. X.R.

117—33.56